United States Patent
Niu

(10) Patent No.: US 8,656,211 B2
(45) Date of Patent: Feb. 18, 2014

(54) AVOIDING FAILOVER IDENTIFIER CONFLICTS

(75) Inventor: Xiao Fei Niu, Beijing (CN)

(73) Assignee: CA, Inc., Islandia, NY (US)

( * ) Notice: Subject to any disclaimer, the term of this patent is extended or adjusted under 35 U.S.C. 154(b) by 399 days.

(21) Appl. No.: 13/030,235

(22) Filed: Feb. 18, 2011

(65) Prior Publication Data

US 2012/0216071 A1    Aug. 23, 2012

(51) Int. Cl.
    *G06F 11/00*      (2006.01)

(52) U.S. Cl.
    USPC ............................ 714/4.11; 714/4.21; 714/13

(58) Field of Classification Search
    USPC .................. 714/4.11, 4.12, 4.21, 13; 709/203
    See application file for complete search history.

(56) References Cited

U.S. PATENT DOCUMENTS

| | | | |
|---|---|---|---|
| 5,852,724 | A | 12/1998 | Glenn, II et al. |
| 6,070,251 | A | 5/2000 | Chong |
| 6,144,999 | A | 11/2000 | Khalidi et al. |
| 6,151,684 | A | 11/2000 | Alexander et al. |
| 6,243,825 | B1 | 6/2001 | Gamache et al. |
| 6,594,786 | B1 | 7/2003 | Connelly et al. |
| 6,745,241 | B1 * | 6/2004 | French et al. .................. 714/15 |
| 6,854,072 | B1 | 2/2005 | Cagle et al. |
| 6,920,580 | B1 * | 7/2005 | Cramer et al. .............. 714/4.11 |
| 6,944,785 | B2 | 9/2005 | Gadir et al. |
| 7,437,445 | B1 | 10/2008 | Roytman et al. |
| 7,464,151 | B1 | 12/2008 | Drennen et al. |
| 7,617,216 | B2 | 11/2009 | Fridella et al. |
| 7,634,683 | B2 | 12/2009 | De La Cruz et al. |
| 2006/0031540 | A1 | 2/2006 | Purontaus et al. |
| 2007/0150594 | A1 | 6/2007 | Andreev et al. |
| 2007/0174691 | A1 * | 7/2007 | D'Souza et al. ................ 714/13 |
| 2007/0294563 | A1 | 12/2007 | Bose |
| 2008/0091895 | A1 | 4/2008 | Chen |
| 2008/0172679 | A1 | 7/2008 | Shen et al. |
| 2009/0037763 | A1 * | 2/2009 | Adhya et al. ...................... 714/4 |
| 2009/0157766 | A1 | 6/2009 | Shen et al. |
| 2009/0307246 | A1 | 12/2009 | Schuler et al. |
| 2010/0281181 | A1 * | 11/2010 | Johnson et al. .............. 709/245 |

OTHER PUBLICATIONS

Jones, Richard, "*Survival of the Fittest: Disaster Recovery Design for the Data Center*", Burton Group, Version 1.0, 45 pages, Sep. 10, 2007.

"*Business Continuity and Disaster Recovery with CA Recovery Management and VMware Infrastructure*", Technology Brief: CA Recovery Management and VMware Infrastructure, CA Recovery Management Team, http://www.ca.com/files/whitepapers/businesscont_vmware_techbrief_172206.pdf, 20 pages, 2008.

* cited by examiner

*Primary Examiner* — Joseph D Manoskey
(74) *Attorney, Agent, or Firm* — Baker Botts, LLP

(57) ABSTRACT

In certain embodiments, a service provided by a production server is facilitated. The production server is associated with a backup server configured to take over if the production server fails. The production server assigned a first identifier. A failover with a potential identity conflict is determined to have occurred. In the failover, the backup server has taken over for the production server and has been assigned the first identifier. A second identifier is assigned to the production server to replace the first identifier that was assigned to the production server in order to avoid the identity conflict.

24 Claims, 1 Drawing Sheet

AVOIDING FAILOVER IDENTIFIER CONFLICTS

TECHNICAL FIELD

This invention relates generally to the field of computer system recovery and more specifically to avoiding failover identifier conflicts.

BACKGROUND

Servers may provide a service to a client system. In certain situations, redundant servers may be used to provide backup if a server fails. For example, a backup server may be configured to take over operation if a production server fails.

SUMMARY OF THE DISCLOSURE

In accordance with the present invention, disadvantages and problems associated with previous techniques for computer system recovery may be reduced or eliminated.

In certain embodiments, a service provided by a production server is facilitated. The production server is associated with a backup server configured to take over if the production server fails. The production server assigned a first identifier. A failover with a potential identity conflict is determined to have occurred. In the failover, the backup server has taken over for the production server and has been assigned the first identifier. A second identifier is assigned to the production server to replace the first identifier that was assigned to the production server in order to avoid the identity conflict.

Certain embodiments of the invention may provide one or more technical advantages. A technical advantage of one embodiment may be that a helper service may change an identifier of a production server if a failover occurs to avoid an identifier conflict. Another technical advantage of one embodiment may be that the helper service may run on a production server such that the helper service may operate on the production server if the production server fails.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
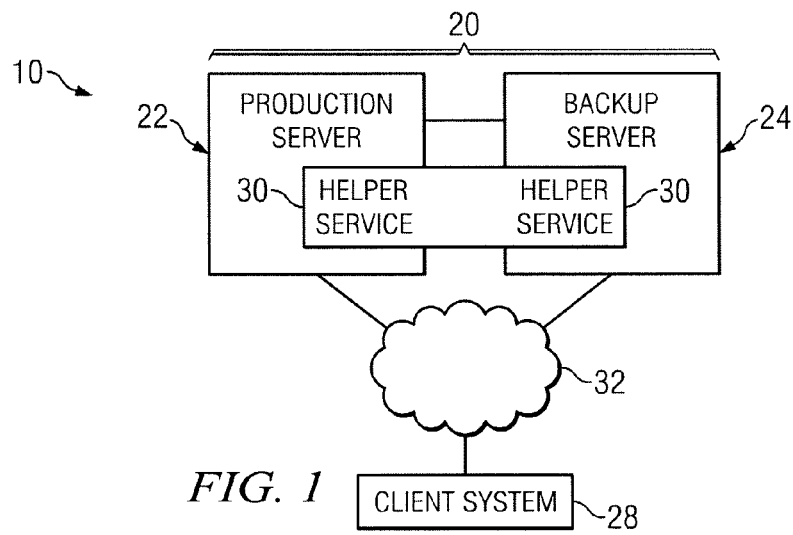
FIG. 1 illustrates an example of a system that may be used to avoid an identifier conflict.
Figure 2:
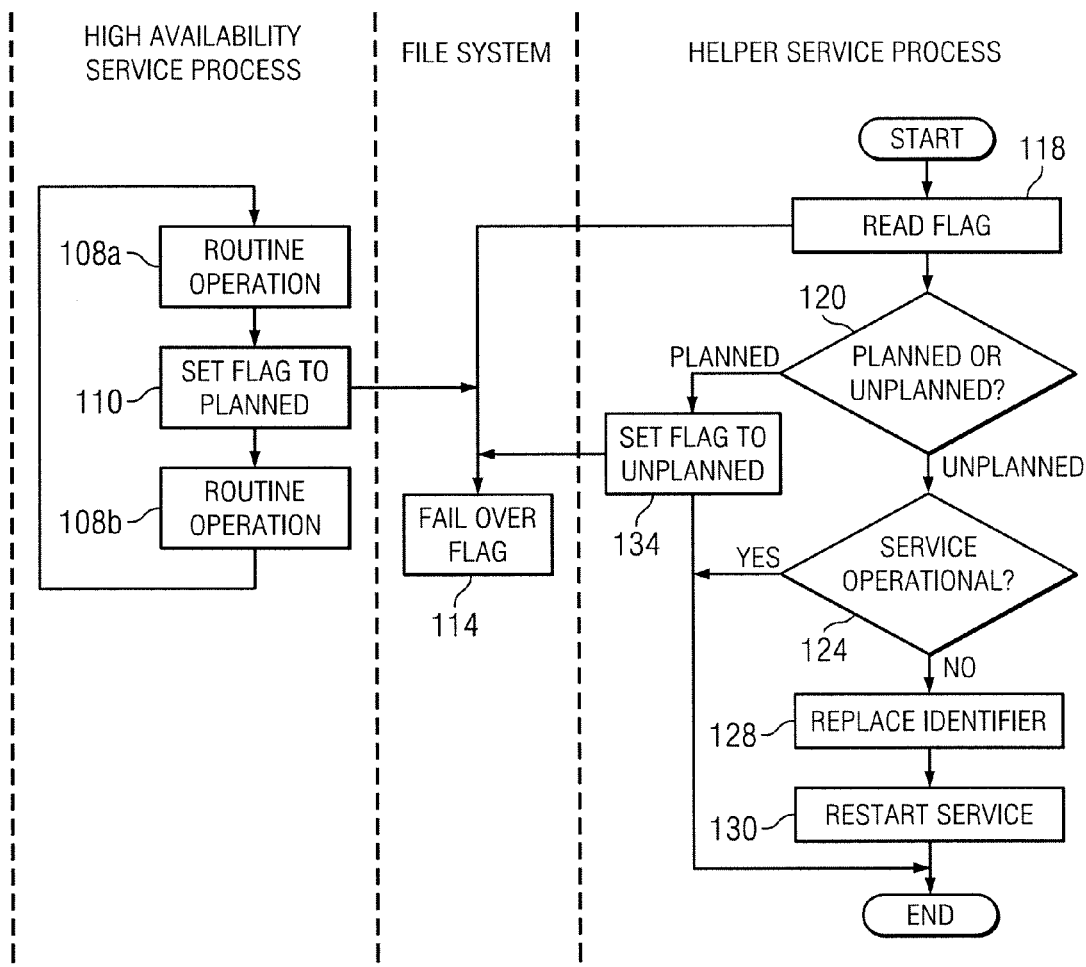
FIG. 2 illustrates an example of a method that may be used to avoid an identifier conflict.

Embodiments of the present invention and its advantages are best understood by referring to FIGS. 1 and 2 of the drawings, like numerals being used for like and corresponding parts of the various drawings.

FIG. 1 illustrates an example of a system 10 that may be used to avoid an identifier conflict. In certain embodiments, system 10 may include a helper service 30 that may change an identifier of a production server 22 if a failover occurs to avoid an identifier conflict. In the illustrated example, system 10 includes servers 20 (that may include a production server 22 and a backup server 24), a helper service 30, a communication network 32, and a client system 28 coupled as shown.

In certain examples of operation, helper service 30 facilitates a service provided by production server 22. Production server 22 is associated with backup server 24 that is configured to take over if production server 22 fails. Production server 22 is assigned a first identifier. Helper service 30 determines that a failover with potential identity conflict has occurred in which backup server 24 has taken over for production server 22 and has been assigned the first identifier. Helper service 30 assigns a second identifier to production server 22 to replace the first identifier that was assigned to production server 22 in order to avoid the identity conflict. In certain embodiments, helper service 30 may run on production server 22 such that helper service 30 may operate on production server 22 if production server 22 fails.

In certain embodiments, client system 28 is a computer system that interacts with servers 20 through communication network 32 in order to receive a service provided by servers 20. Client system 28 may have any suitable operating system (OS), for example, Windows, Unix/Linux, or Mac OS.

A server 20 is a computing system that may provide a service across a network of computers. Any suitable service may be provided. For example, an application server runs software applications for client systems 28. A catalogue server operates as a central search point for information across a network. A communication server provides communication services to client system 28. A database server provides database services. A file server provides file services. A web server provides web services.

In certain embodiments, a server 20 may have an identifier that uniquely identifies server 20 and distinguishes server 20 from other servers 20 and devices. An identifier may be assigned to server 20 by a name server. Examples of identifiers include IP addresses and computer names. Examples of computer names include a host name and/or a domain/zone name to which the host belongs, for example:

someserver.somesubdomain.somedomain.com.

In the illustrated example, servers 20 include a production server 22 and a backup server 24. Production server 22 provides the service to client system 28, while backup server 24 is configured to take over if production server 22 fails and cannot provide the service. A server 20 may be considered operational (or not failing) if a server 20 is operating and providing the service to client system 28. A server 20 may be regarded as not operational (or failing) if server 20 cannot provide the service. In certain embodiments, backup server 24 may have data replicated from production server 22 in order to be able to take over operation from production server 22 in case production server 22 fails.

In a failover, backup server 24 automatically takes over for production server 22 if production server 22 fails. A planned failover (or switchover) typically occurs with human intervention and may be planned in order to perform system maintenance, such as installing patches or upgrading software or hardware. An unplanned failover typically occurs without planning. An unplanned failover may occur as a result of, for example, a power outage or a failure in the hardware and/or software of production server 22.

In certain situations, an identify conflict may occur. In these situations, production server 22 may be assigned a first production identifier, and backup server may be assigned a backup identifier. Production server 22 may be logged into a network accessed by client system 28 with the first identifier to provide a service to client system 28. If a failover occurs, backup server 24 takes over for production server 22 and provides the services. During the failover process, backup server 24 logs into the network using the first identifier so that back up server 24 can provide the service while production server 22 is down. When production server 22 starts back up, however, it cannot log back into the network with a first identifier, because back up server 24 is already logged in using the first identifier. In this situation, an identifier conflict occurs.

In certain embodiments, helper service 30 may be used to avoid identifier conflicts. In the embodiments, helper service 30 facilitates a service provided by production server 22. Helper service 30 may facilitate the service by monitoring production server 22 (for example, using an interface). In the embodiments, helper service 30 determines that a failover with potential identity conflict (or "potential ID conflict failover") has occurred. Helper service 30 may make the determination in any suitable manner, for example, by determining that the failover is an unplanned failover and/or establishing that the service is not operational.

Helper service 30 may determine that the failover is planned or unplanned failover in any suitable manner. In certain embodiments, a failover flag may be used to indicate whether a failover is planned or unplanned. For example, a failover flag may be set to true to indicate that a failover is unplanned and false to indicate that a failover is planned, or vice-versa. Helper service 30 may check a failover flag to determine that the failover is an unplanned failover. The failover flag may be system wide (for example, file system wide or operating system wide) such that any process in the system 22 or 24 may read or write the flag. The failover flag persists in servers 22 and/or 24 and is present when an operating system starts up. For example, the failover flag may be stored in a file server, a hard disk, or a system registry entry.

Helper service 30 may establish that the high availability (HA) service is not operational in any suitable manner. In certain embodiments, helper service 30 may check whether production server 22 is exhibiting normal operation and vital signs. In the embodiments, certain problems may indicate that the service is not operational. For example, production server 22 may not be able to access a network due to an identity conflict. In another example, a service depending on the identity of production server 22 may fail to start due to an identity conflict.

Helper service 30 assigns a second production identifier to production server 22 to replace the first production identifier that was assigned to production server 22 in order to avoid the identity conflict. Helper service 30 may assign the identifier in any suitable manner. For example, helper service 30 may re-name the computer name of production server 22 to another unique name and/or remove the IP address that was assigned to production server 22. In certain embodiments, helper service 30 may restart the HA service after assigning the second identifier to the production server.

In certain embodiments, helper service 30 may run on production servers 22 and/or 24 such that helper service may operate on production server 22 and/or 24 if production server 22 and/or 24 fails. In certain embodiments, helper service 30 does not depend on a server identifier to start up. Helper service 30 may use a local system or a local administrator as a log on account.

FIG. 2 illustrates an example of a method for avoiding a failover identifier conflict. The method may be performed by helper service 30, which may be initiated at any suitable time, such as when server 22 or 24 starts or in response to a user request. In the example, production server 22 has a first identifier.

Steps 108 (108a-b) and 110 may be performed by a high availability service process. Routine operation occurs at steps 108a-b. A planned failover occurs during routine operation, so a failover flag is set to planned at step 110.

A failover flag is stored in a file system at step 114. The flag may be stored in a file system utility. If a failover was planned, the failover flag is set to planned in order to indicate that the failover was planned and that there is no need to perform a procedure to avoid identifier conflict. If a failover was not planned, the failover flag is set to unplanned.

Steps 118 through 134 may be performed by a helper service process. Helper service 30 may facilitate in the high availability service by monitoring servers 20. In certain embodiments, helper service 30 may monitor servers 20 in order to determine that servers 20 are providing the service. For example, helper service 30 may read a failover flag, as at step 118. The failover flag may be set to unplanned or planned at step 120 to indicate that a failover is planned or unplanned. If the flag is set to unplanned the method proceeds to step 124.

The service may be operational at step 124. Helper service 30 may determine if the service is operational by checking vital signs of production server 22. If the service is operational, there is no need for a procedure to avoid identifier conflict, and the method terminates. If the service is not operational, a failover may have occurred and backup server 24 may now be logged into the network using the first identifier. Accordingly, the method proceeds to step 128 to perform a procedure that avoids an identifier conflict.

The identifier of production server 22 is replaced at step 128. Since backup server 24 is logged into the operating system using the first identifier, production server 22 is assigned a second identifier that is different from the first identifier to allow production server 22 to log into the operating system. The service is restarted at step 130. Helper service 30 may restart production server 22. Production server may now log in using the second identifier.

If the flag is set to planned at step 120, the method proceeds to step 134. The failover flag is set to unplanned at step 134. The failover flag may be set to unplanned in order to use it for the next potential problem. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of helper service 30 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component (such as helper service 30) of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network (such as communication network 32) may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   facilitating, by one or more processors, a service provided by a production server, the production server associated with a backup server configured to take over if the production server fails, the production server assigned a first identifier;
   determining, by the one or more processors, that a failover with a potential identity conflict has occurred in which the backup server has taken over for the production server and has been assigned the first identifier; and
   assigning, by the one or more processors, a second identifier to the production server to replace the first identifier that was assigned to the production server in order to avoid the identity conflict.

2. The method of claim 1, the first and the second identifiers comprising one of: a plurality of Internet Protocol (IP) addresses, and a plurality of computer names.

3. The method of claim 1, the determining that a failover with a potential identity conflict has occurred further comprising:
   checking whether a failover flag is set to planned or unplanned to determine whether the failover is an unplanned failover.

4. The method of claim 1, the determining that a failover with a potential identity conflict has occurred further comprising:
   establishing that the service is not operational.

5. The method of claim 1, further comprising:
   setting a failover flag to planned or unplanned and storing the failover flag in a file system utility to indicate whether a failover is a planned failover or an unplanned failover.

6. The method of claim 1, further comprising:
   restarting the service after assigning the second identifier to the production server.

7. The method of claim 1, further comprising: determining that the service is operational and maintaining the first identifier for the production server.

8. The method of claim 1, wherein the service provided by a production server runs locally on the production server independently of the production server's identifier.

9. One or more non-transitory computer-readable media having computer-executable code, when executed by a computer operable to:
   facilitate a service provided by a production server, the production server associated with a backup server configured to take over if the production server fails, the production server assigned a first identifier;
   determine that a failover with a potential identity conflict has occurred in which the backup server has taken over for the production server and has been assigned the first identifier; and
   assign a second identifier to the production server to replace the first identifier that was assigned to the production server in order to avoid the identity conflict.

10. The media of claim 9, the first and the second identifiers comprising one of: a plurality of Internet Protocol (IP) addresses, and a plurality of computer names.

11. The media of claim 9, the determining that a failover with a potential identity conflict has occurred further comprising:
    checking whether a failover flag is set to planned or unplanned to determine whether the failover is an unplanned failover.

12. The media of claim 9, the determining that a failover with a potential identity conflict has occurred further comprising:
    establishing that the service is not operational.

13. The media of claim 9, the code operable to:
    set a failover flag to planned or unplanned and storing the failover flag in a file system utility to indicate whether a failover is a planned failover or an unplanned failover.

14. The media of claim 9, the code operable to:
    restart the service after assigning the second identifier to the production server.

15. The media of claim 9, the code operable to: determine that the service is operational and maintain the first identifier for the production server.

16. The media of claim 9, wherein the service provided by a production server runs locally on the production server independently of the production server's identifier.

17. An apparatus comprising:
    an interface configured to:
        facilitate a service provided by a production server, the production server associated with a backup server configured to take over if the production server fails, the production server assigned a first identifier; and
    one or more processors configured to:
        determine that a failover with a potential identity conflict has occurred in which the backup server has taken over for the production server and has been assigned the first identifier; and assign a second identifier to the production server to replace the first identifier that was assigned to the production server in order to avoid the identity conflict.

18. The apparatus of claim 17, the first and the second identifiers comprising one of: a plurality of Internet Protocol (IP) addresses, and a plurality of computer names.

19. The apparatus of claim 17, the determining that a failover with a potential identity conflict has occurred further comprising:

checking whether a failover flag is set to planned or unplanned to determine whether the failover is an unplanned failover.

20. The apparatus of claim 17, the determining that a failover with a potential identity conflict has occurred further comprising:

establishing that the service is not operational.

21. The apparatus of claim 17, the processors operable to: set a failover flag to planned or unplanned and store the failover flag in a file system utility to indicate whether a failover is a planned failover or an unplanned failover.

22. The apparatus of claim 17, the processors operable to: restart the service after assigning the second identifier to the production server.

23. The apparatus of claim 17, the processors operable to: determine that the service is operational and maintain the first identifier for the production server.

24. The apparatus of claim 17, wherein the service provided by a production server runs locally on the production server independently of the production server's identifier.

* * * * *